Dec. 16, 1941.  H. W. JONES  2,266,552
METHOD OF CUTTING FERROUS METAL BODIES
Filed Nov. 16, 1939
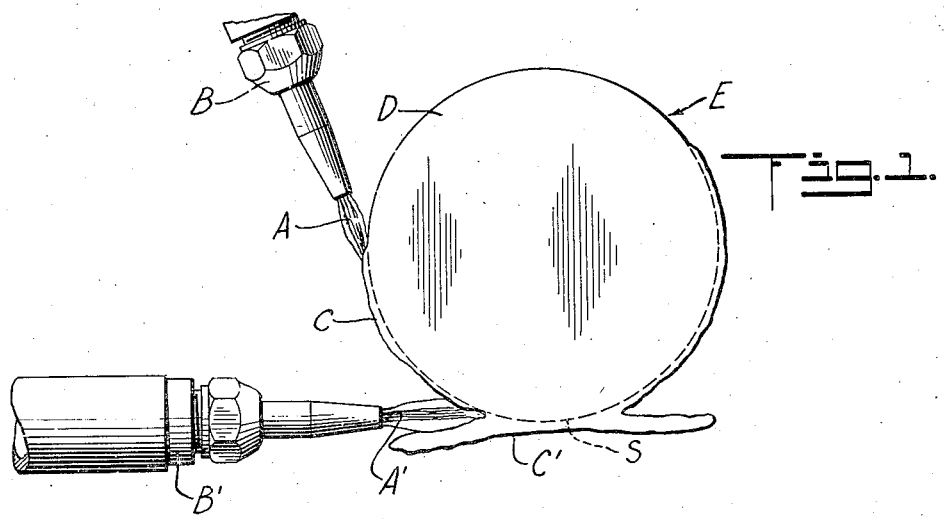
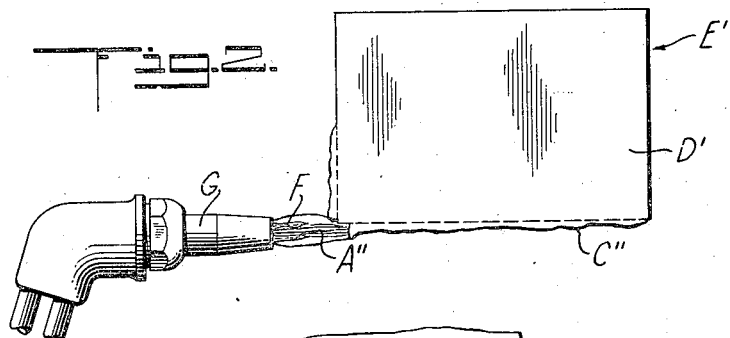
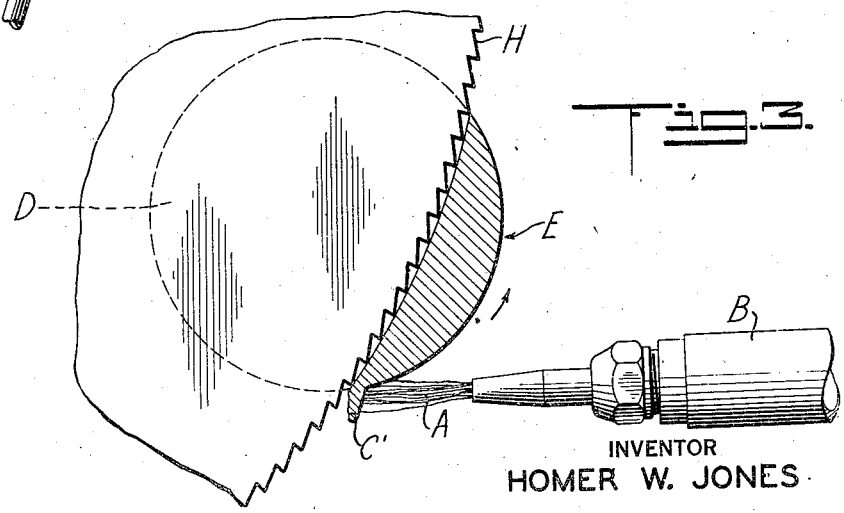
INVENTOR
HOMER W. JONES
BY
*SL Greenewald*
ATTORNEY Patented Dec. 16, 1941

2,266,552

UNITED STATES PATENT OFFICE 2,266,552

METHOD OF CUTTING FERROUS METAL BODIES

Homer W. Jones, Westfield, N. J., assignor to The Linde Air Products Company, a corporation of Ohio Application November 16, 1939, Serial No. 304,758

9 Claims. (Cl. 148—9)

This invention relates to the art of mechanically cutting metal bodies and more specifically to a method of removing protuberances produced on metal bodies in a mechanical cutting operation.

It is common practice in the metal industries to saw billets, bars, plates and other shapes during the shaping or fabricating processes, by means of circular or reciprocating metallic saws. In the ferrous metal industries, billets, bars, and other semi-finished and finished forms are sawed into appropriate lengths immediately after hot rolling and while at a high temperature, such operations being known as "hot-sawing." High-speed circular metallic saws of special composition and/or construction are usually employed in hot-sawing operations.

As a result of such mechanical sawing operations and other mechanical hot cutting operations, a burr or fin usually is produced by the saw or other mechanical cutting tool or cutting means as it cuts through the exterior side and under surface of the metal body. In hot-sawing operations part of the fin or burr produced is strictly fin-like and adheres tightly to the edge of the cut, and part is loose and hanging, both as shown in Fig. 1 of the accompanying drawing. Such external protuberances, which may be formed on one or both sides of the cut, are troublesome, and if not removed may later cause either processing difficulties or surface imperfections. This is especially true if the stock is to be rolled after it is cut, because in rolling, these protuberances will be pressed into the bar or billet and a defective end will be produced. Such protuberances are particularly troublesome where the metal is to be used as stock for producing seamless tubes by a hot-piercing operation, because the end from which the piercing operation is begun must be clean and free of all protuberances, otherwise they will form imperfections in the finished tube.

It has been common practice to remove the protuberances produced in hot-sawing operations by hand-chipping or similar methods after cooling the metallic body to a working temperature, but these methods are expensive and time-consuming because considerable time is lost in cooling the body to a comfortable chipping temperature and in reheating the body to a working or rolling temperature, and such reheating involves the expense of extra heat.

The principal objects of this invention are: to provide a novel method of removing protuberances such as burrs produced on a metallic surface as a result of a hot-sawing or other mechanical cutting operation; to provide a novel method of continuously removing burrs from a hot metallic surface as they are being formed during a hot-sawing operation; to provide a method of removing burrs from hot metallic surfaces in which it is unnecessary to cool the surface from which the burr is to be removed and, in which a stream of oxidizing gas is employed as the burr-removing agent; and to provide a method of heating the burr or line of burr formation to its oxidation temperature, in cases where the temperature of the burr after or during sawing or cutting is lower than the oxidation or ignition temperature of the metal which is being sawed or cut, so that the burr so heated can be removed by applying a stream of oxidizing gas against it.

The above and other objects and the novel features of this invention will become apparent from the following description, and from the accompanying drawing in which Figs. 1, 2, and 3 diagrammatically represent three applications of the method of this invention.

Referring to the drawing and particularly to Fig. 1, D designates the end face of a hot sawed round bar or billet E. The bar has been sawed downwardly perpendicular to its longitudinal axis, thereby leaving a tightly adhering fin or burr of metal C on the side and bottom portions of the periphery of the sawed face D. A larger and more loosely hanging fin or burr C' may also be produced and remain attached to the under edge portion of the freshly sawed face. Such loose burr remains attached at that edge portion of the freshly sawed face which was the last to be cut by the saw. To remove such metallic burrs immediately after the metal body has been hot-sawed and while the burrs are still hot and substantially at their temperature of ignition in oxygen, one or more streams of oxidizing gas are directed against them in any suitable manner, such as by means of blowpipes, such stream or streams being applied either parallel to or transversely against the hot burrs.

As shown, an oxygen jet A discharged by a blowpipe B may be directed lengthwise of the hot burr C; and at the same time an oxygen jet A' discharged by a blowpipe B' may be directed lengthwise of the burr C'. The stream of oxidizing gas employed in each instance preferably has a low velocity so that the fin-like and hanging burrs may be completely oxidized or burned off without burning or otherwise damaging the metal of the body E adjacent the burrs. A suitable range of gas velocities to be used in such conditions has been found to be between 200 and 500 ft. per second, which is much lower than the velocity of a conventional high velocity oxygen cutting jet. The hot metallic burr is completely oxidized as the low velocity oxidizing gas impinges against it; and, aided by gravity and the kinetic energy of the oxidizing gas, the oxidized metal falls away from the edge of the cut face D on which the burr was formed, leaving a clean side surface S entirely free of protuberances. By rotating the billet E about its axis and while the jet A is directed against the burred edge, a single oxidizing jet may serve to remove both burrs C and C' and produce a clean surface entirely around the periphery of the face D.

When ferrous metal sections are hot-sawed, the temperature of the burr produced is usually high enough to permit successfully removing the burr immediately after the hot-sawing operation by the method just described, but in some forms of hot-sawing and in cases where burrs are produced on ferrous metal surfaces by other mechanical cutting operations, the temperature of the burr produced may not be close enough to its ignition temperature to successfully oxidize it by this method. In such cases a suitable heating medium may be directed against the burr to heat it to its ignition temperature. As illustrated by Fig. 2, a rectangular ferrous metal bar E' has been downwardly cut so as to leave a fin-like burr C" adhering to the lower edges of the freshly cut face D'. An oxidizing gas stream A" is directed lengthwise of the burr C" as before, and preferably is supplemented by the preheating action of heating flames F, such as those associated with the cutting oxygen jet of a standard oxyacetylene cutting nozzle G. After thus heating the burr to its ignition temperature, the oxidizing gas stream A" can then efficiently remove the metallic burr C" in a manner similar to that previously described.

It is also practicable, in many instances, to remove burrs by using an oxidizing flame produced by a gas stream consisting of a mixture of oxygen and a fuel gas, and containing an excess of oxygen over that required to burn the fuel or acetylene gas, in lieu of a separate oxygen jet supplemented by the usual neutral preheating flames.

Another embodiment of this method is illustrated in Fig. 3 showing the hot bar E being cut by a circular metal saw blade H, the burr C' being formed at the point where the saw teeth break through the outer surface of the metal body. In such sawing operations, any of the procedures described above may be employed to continuously remove the burr as it forms while the hot-sawing operation is in progress. By continuously directing the oxidizing gas stream A, with or without the aid of preheating flames as may be required, against the burr C' at its point of formation and so as not to damage the saw H, the burr can be removed efficiently as it is being formed. The blowpipe B, with the gas stream or streams discharging therefrom should preferably be moved around the surface of the bar E at substantially the same rate as the saw blade advances and breaks through the outer surface of the bar.

It will be apparent that the fin-removing blowpipes and the metal body should preferably be supported in operating position by suitable apparatus which may be arranged to effect relative movement between the blowpipes and the metal body in the proper direction and at the proper speed to maintain the oxygen jets and heating flames in correct position to completely eliminate the fins. Also, if the metal body is a round billet it may be rotated with respect to the fin-removing blowpipes. The use of such mechanism is particularly desirable when the metal bodies are sawed while hot.

The method of burr removal of the present invention makes possible the removal of protuberances which may be produced on a metal body much more rapidly and easily than when hand-chipping methods are employed. Furthermore, it is not necessary to cool the metallic body after a hot-sawing operation in order to remove the burrs when the burr removal method disclosed herein is employed. Thus the use of this method results in the saving of much time which would be lost in cooling the metal bodies before the burrs could be removed therefrom by hand-chipping methods, and also in the saving of the time and heat required to reheat the bodies, if necessary, subsequent to thus removing the burrs from them.

As employed in the claims, the word "fin" is not used in a limiting sense, but is intended to cover all protuberances which may be formed on a metal body as a result of a hot-sawing or other analogous mechanical hot-cutting operation.

The embodiments of the invention herein described and illustrated in the accompanying drawing are presented merely to indicate how the invention may be applied. Other forms differing in detail, but not in essentials from those described, will readily suggest themselves to those skilled in the art.

I claim:

1. In the art of severing a ferrous metal body with a mechanical cutting tool while said body is at an elevated temperature at least of the order of its hot-rolling temperature, and wherein an external fin is formed on said hot metal body at the outer edge of the freshly severed surface, the process of thermochemically removing said fin from said outer edge without setting up rapid oxidation or burning of said hot metal body, which comprises, directing from the outside of the resulting kerf a relatively low-velocity stream of oxidizing gas substantially exclusively against said fin and so as to avoid entry of said oxidizing gas stream into said kerf, while said fin is heated to its kindling temperature at least partially by virtue of the elevated temperature of said body, the direction and relatively low velocity of said oxidizing gas stream being such that said fin is completely removed by thermochemical reaction but so that the metal of said body is not detrimentally oxidized thereby.

2. The process as defined in claim 1, in which said low-velocity oxidizing gas stream is directed against said fin immediately upon the completion of the hot-cutting operation.

3. The process as defined in claim 1, in which said fin is at least partially heated to its kindling temperature by applying one or more high-temperature heating flames against said fin.

4. The process as defined in claim 1, in which said low-velocity oxidizing gas stream is directed against said fin transversely thereof, and relative movement between said metal body and said oxidizing gas stream is effected so that said fin is completely removed from, and a clean surface is produced around, the entire periphery of said freshly severed surface.

5. The process as defined in claim 1, in which said low-velocity oxidizing gas stream is directed against said fin concurrently with the hot-cutting operation and in such manner as not to damage said cutting tool.

6. In the art of severing a ferrous metal body with a mechanical cutting tool while said body is at an elevated temperature at least of the order of its hot-rolling temperature, and wherein a fin is formed on said hot metal body at the outer edge of the freshly severed surface, the process of thermochemically removing said fin from said outer edge without setting up rapid oxidation or burning of said hot metal body, the temperature of said fin being below its kindling temperature, which process comprises directing from the outside of the kerf resulting from the severing operation, a relatively low-velocity gas stream of oxidizing gas including a mixture of oxygen and fuel gas and containing an excess of oxygen, substantially exclusively against said fin and so as to avoid entry of any substantial portion of said gas stream into said kerf, the direction and relatively low velocity of said gas stream being such that said fin is completely removed by thermochemical reaction but such that the metal of said body is not detrimentally oxidized thereby.

7. A metal cutting process which comprises cutting a body of oxidizable metal while at an elevated temperature at least of the order of the hot-rolling temperature thereof and so as to leave an adhering fin of such metal along the outer edge of the freshly cut surface, and burning off said fin by directing a relatively low-velocity jet of oxidizing gas against said fin while the latter is heated to substantially its kindling temperature at least partially by virtue of the elevated temperature of said body, said low-velocity jet being directed against said fin so as to oxidize it completely but so as not to oxidize detrimentally any of the metal of said body.

8. In the art of severing a ferrous metal body with a mechanical cutting tool while said body is at an elevated temperature at least of the order of its hot-rolling temperature, and wherein a plurality of external fins are formed on said hot metal body at the outer edge of the freshly severed surface, the process of thermochemically removing said fins from said outer edge without setting up rapid oxidation or burning of said hot metal body, which comprises, directing from the outside of the resulting kerf a plurality of relatively low-velocity streams of oxidizing gas substantially exclusively against said fins and so as to avoid entry of said oxidizing gas streams into said kerf, while said fins are heated to their kindling temperature at least partially by virtue of the elevated temperature of said body, the direction and relatively low velocity of said oxidizing gas streams being such that said fins are completely removed by thermochemical reaction but such that the metal of said body is not detrimentally oxidized thereby.

9. A metal cutting process which comprises cutting a body of oxidizable metal while at an elevated temperature at least of the order of the hot-rolling temperature thereof and so as to leave an adhering fin of such metal along the outer edge of the freshly cut surface, and burning off said fin by directing a relatively low-velocity jet of oxidizing gas against said fin while the latter is heated to substantially its kindling temperature at least partially by virtue of the elevated temperature of said body, said oxidizing gas jet and said body being moved relatively about the longitudinal axis of said body, and said oxidizing gas jet being directed against said fin so as to oxidize it completely and produce a clean surface around the entire periphery of said freshly cut surface but so as not to oxidize detrimentally any of the metal of said body.

HOMER W. JONES.